(12) United States Patent
Raikar et al.

(10) Patent No.: US 7,712,133 B2
(45) Date of Patent: *May 4, 2010

(54) INTEGRATED INTRUSION DETECTION SYSTEM AND METHOD

(75) Inventors: Amit Raikar, Sunnyvale, CA (US); Bryan Stephenson, Alviso, CA (US); John Mendonca, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1724 days.

This patent is subject to a terminal disclaimer.

(21) Appl. No.: 10/600,113

(22) Filed: Jun. 20, 2003

(65) Prior Publication Data

US 2004/0260945 A1 Dec. 23, 2004

(51) Int. Cl.
*G06F 11/00* (2006.01)
*G06F 12/14* (2006.01)
*G06F 12/16* (2006.01)
*G08B 23/00* (2006.01)

(52) U.S. Cl. .................. 726/23; 726/1; 726/11

(58) Field of Classification Search .......... 726/23, 726/1, 11
See application file for complete search history.

(56) References Cited

U.S. PATENT DOCUMENTS

| | | | |
|---|---|---|---|
| 6,279,113 B1 * | 8/2001 | Vaidya ........................ 726/23 |
| 6,405,318 B1 * | 6/2002 | Rowland ..................... 726/22 |
| 6,714,513 B1 * | 3/2004 | Joiner et al. ................ 370/224 |
| 6,754,705 B2 * | 6/2004 | Joiner et al. ................ 709/224 |
| 6,789,117 B1 * | 9/2004 | Joiner et al. ................ 709/224 |
| 6,789,202 B1 * | 9/2004 | Ko et al. ...................... 726/23 |
| 6,892,227 B1 * | 5/2005 | Elwell et al. ................ 709/218 |
| 6,941,358 B1 * | 9/2005 | Joiner et al. ................ 709/220 |
| 7,007,301 B2 * | 2/2006 | Crosbie et al. .............. 726/23 |
| 7,062,783 B1 * | 6/2006 | Joiner ........................ 726/23 |
| 7,065,657 B1 * | 6/2006 | Moran ......................... 726/5 |
| 7,076,803 B2 * | 7/2006 | Bruton et al. ............... 726/23 |
| 7,154,857 B1 * | 12/2006 | Joiner et al. ............... 370/245 |
| 7,222,366 B2 * | 5/2007 | Bruton et al. ............... 726/23 |
| 7,386,733 B2 * | 6/2008 | Yoon et al. .................. 713/189 |
| 2002/0069369 A1 * | 6/2002 | Tremain ..................... 713/201 |
| 2002/0087882 A1 * | 7/2002 | Schneier et al. ............ 713/201 |
| 2002/0184532 A1 * | 12/2002 | Hackenberger et al. .... 713/201 |
| 2003/0023876 A1 * | 1/2003 | Bardsley et al. ............ 713/201 |
| 2003/0097588 A1 * | 5/2003 | Fischman et al. .......... 713/200 |
| 2003/0145225 A1 * | 7/2003 | Bruton et al. .............. 713/201 |
| 2003/0145226 A1 * | 7/2003 | Bruton et al. .............. 713/201 |
| 2003/0188189 A1 * | 10/2003 | Desai et al. ................ 713/201 |
| 2003/0196123 A1 * | 10/2003 | Rowland et al. ........... 713/201 |
| 2004/0015718 A1 * | 1/2004 | DeClouet .................... 713/201 |
| 2004/0034800 A1 * | 2/2004 | Singhal et al. ............. 713/201 |
| 2004/0073800 A1 * | 4/2004 | Shah et al. .................. 713/176 |
| 2004/0088583 A1 * | 5/2004 | Yoon et al. .................. 713/201 |
| 2004/0098623 A1 * | 5/2004 | Scheidell ................... 713/201 |
| 2004/0123141 A1 * | 6/2004 | Yadav ........................ 713/201 |
| 2005/0257267 A1 * | 11/2005 | Williams et al. ............ 726/25 |

* cited by examiner

*Primary Examiner*—David García Cervetti

(57) ABSTRACT

A present invention integrated intrusion detection method integrates intrusion detection information. In one embodiment, intrusion detection information is gathered from a plurality of different types of intrusion detection sensors. The information is processed in a manner that provides a consolidated correlation of the information. A response is assigned to the information and the response is implemented.

16 Claims, 4 Drawing Sheets

200

Gathering information from a plurality of different types of intrusion detection sensors.
210

↓

Processing the information, wherein the processing provides a consolidation and correlation of the information.
220

↓

Assigning a response corresponding to the information.
230

↓

Implementing the response.
240

FIG. 2

INTEGRATED INTRUSION DETECTION SYSTEM AND METHOD

FIELD OF THE INVENTION

The present invention relates to security. More particularly, the present invention relates to a system and method for consolidating and correlating intrusion detection information.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the use of networked resources that facilitate leveraged utilization of centralized utility and data resources by distributed components. While the leveraged utilization of the centralized resources is advantageous, organization and maintenance of the centralized resources is usually very complex and often susceptible to detrimental intrusive attacks.

Centralizing certain resources within a distributed network typically provides desirable benefits. For example, centrally storing and/or processing information typically reduces wasteful duplicative storage and/or processing resources at each remote networked system. The ever increasing demand for centralized type services is largely attributable to the ever growing cost of specialized information technology services and the increasing complexity of managing mission critical Enterprise and Internet applications. In supporting desirable flexibility and extensibility, centralizing resources can involve handling diverse applications, architectures and topologies (e.g., associated with a multi-vendor environment). Managing the infrastructure of a large and complicated centralized networked resource environment raises many challenging operational issues.

Providing security for important centralized network assets is usually very important and also often complex. Offering ubiquitous access to a diverse set of centralized resources introduces challenges associated with protecting the centralized resources from intrusive attacks (e.g., that can detrimentally affect service quality). Traditional intrusion detection systems are usually limited to one type of sensing capability with each type of intrusion detection sensing involving different strengths and weaknesses. A host intrusion detection system (HIDS) usually tries to detect intrusion on a host. A HIDS is usually limited to sensing very localized events and often only detects events on a particular host system and no where else. Some HIDS are focused on data integrity which may expend a lot of resources on false alarms that are solely triggered by a date problem and do not necessarily provide a reliable indication of an intrusion attempt. A network intrusion detection system (NIDS) usually tries to detect intrusions directed at traffic on a network segment. For example, NIDS are usually limited to sniffing network traffic at a switching point. While NIDS may often be deployed to service a rather significant part of a network, it is usually limited to deployment at a network egress point. Since traditional intrusion detection systems do not typically have broad sensing capabilities, it usually means that the systems have weak or no protection from the types of intrusion attacks which are not the primary focus of a particular sensor.

It is desirable to have protection against a variety of different potential types of intrusion attacks. However, traditionally this involves a variety of different intrusion detection systems and sensors from multiple vendors. Managing diverse overall system intrusion detection is usually difficult and expensive, and often produces increased management difficulties. The various intrusion detection sensors usually issue alerts with different severity assignments and different attributes. Traditionally, it is very difficult to resolve the differences in the sensor alerts to achieve an indication as to the true character and/or severity of an intrusion. For example, different conventional intrusion detection systems have different consoles and databases and intrusion detection sensors often sense different things such as signatures, data anomalies, file changes, and/or source addresses. Dealing with diverse alerts from multi-vendor equipment is usually resource intensive (e.g., an IDS management console for each system) and interpreting the intrusion detection information is usually laborious and often requires a significant level of knowledge and expertise on each proprietary IDS system management console. The diversity can also increase susceptibility to flaws associated with human error (e.g., to circumvention of the underlying infrastructure protection measures through security holes introduced by human error).

The diversity can introduce duplication problems. A system may include two different types of sensors that have at least partially overlapping detection intrusion sensing indications that provide duplicate alarms. Interpreting and recognizing the redundancy can be difficult. Misinterpreting and not recognizing the duplication can be wasteful and lead to detrimental interruptions. For example, some resource administrators may respond to an intrusion attempt by haulting and/or shutting down a system repeatedly. In addition, trying to manually interpret alarms in multi-vendor and multi-type sensor systems can lead to false positive and false negative indications of intrusion attempts. For example, conventional attempts at interpreting a variety of different unconsolidated and uncorrelated alarms can easily result in a false indication of an intrusion attempt or a false indication that an intrusion attempt is not occurring.

In addition to detecting a potential intrusion attempt, it is usually desirable to implement corrective action. Implementing proper corrective action usually relies upon an indication of an intrusion attempt and proper interpretation of the detection information. Traditional attempts at responding to diverse intrusion detection alarms are usually resource intensive and laborious. Understanding the possible appropriate corrective mechanisms to implement an effective incident response strategy and operational framework with traditional event handling operational principles is complex and traditionally a difficult endeavor.

SUMMARY OF THE INVENTION

A present invention integrated intrusion detection method integrates intrusion detection information. In one embodiment, intrusion detection information is gathered from a plurality of different types of intrusion detection sensors. The information is processed in a manner that provides a consolidated correlation of the information. A response is assigned to the information and the response is implemented.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 2 is a flow chart of an integrated intrusion detection method in accordance with one embodiment of the present invention.

DETAILED DESCRIPTION OF THE INVENTION

Figure 1A:
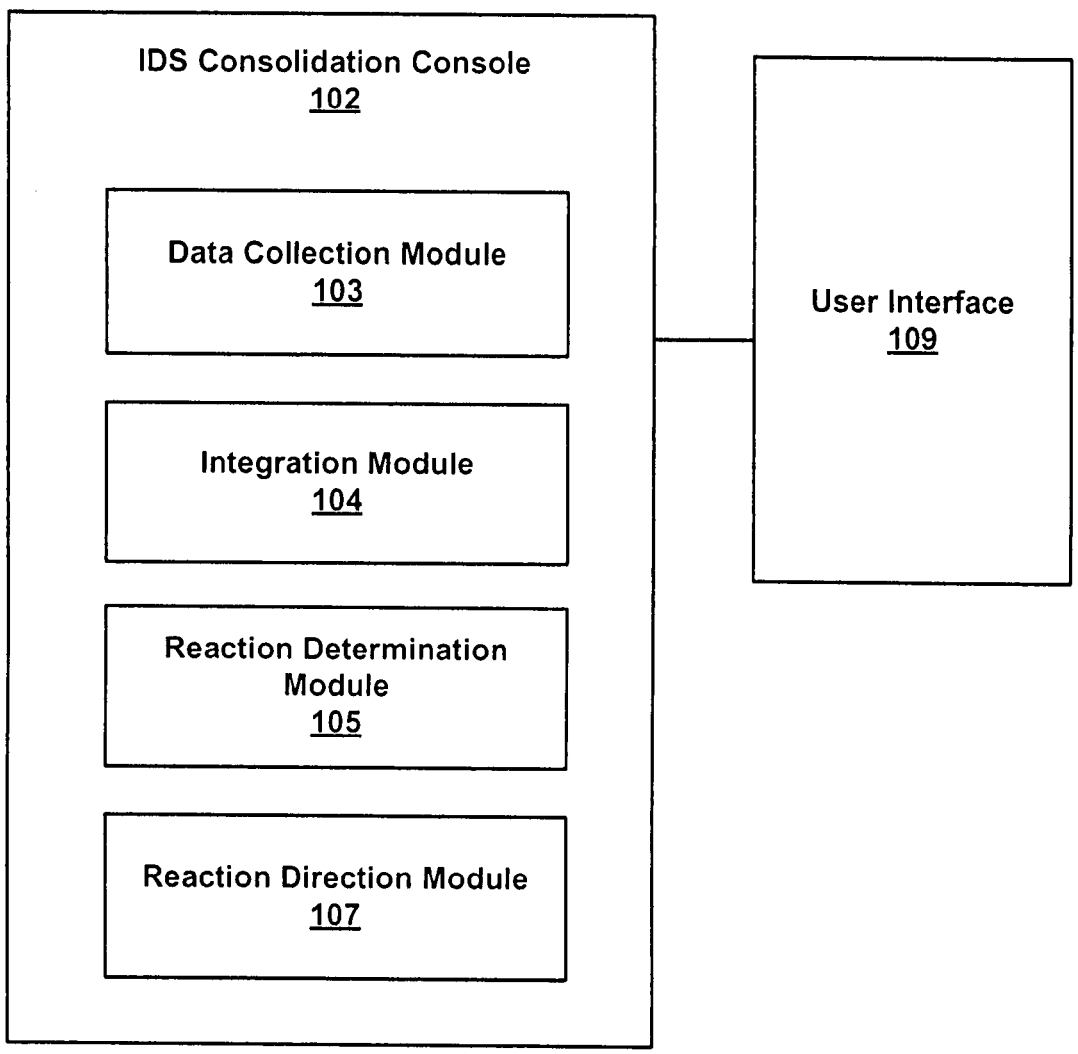
FIG. 1A is a block diagram of an information integration system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here generally conceived to be a sequence of steps or instructions that guide operations of a system to a desired result. The steps include physical manipulations of physical quantities. Usually, though not necessarily, these quantities take the form of electrical, magnetic, optical, or quantum signals capable of being stored, transferred, combined, compared, and otherwise manipulated in a processing system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a system's components (e.g., registers, memories, other such information storage, transmission or display devices, etc.) into other data similarly represented as physical quantities within the same or other components.

The present invention facilitates flexible consolidation and correlation of intrusion detection information from a variety of different Intrusion Detection System (IDS) sensors and systems. The present invention is capable of leveraging network and application management platform (e.g., OVO) features to provide improved and effective newly deployed IDS solutions in a cost effective manner. The present invention also reduces resources required to coordinate and implement an effective enterprise network and host intrusion detection system.

FIG. 1A is a block diagram of intrusion detection integration system 101 in accordance with one embodiment of the present invention. Intrusion detection integration system 101 includes intrusion detection integration console 102 and user interface 109. User interface 109 permits a user to interface with intrusion detection integration console 102. User interface 109 can include a display (e.g., a Video Graphics Array monitor, flat panel monitor, etc.) and an input/output device (e.g., a keyboard, mouse, etc.). Intrusion detection integration console 102 consolidates various different types of intrusion detection information from a variety of different types of intrusion detection sensors and systems.

In one embodiment, intrusion detection integration console 102 includes data collection module 103, integration module 104, reaction determination module 105 and reaction execution module 107. Data collection module 103 receives information from a plurality of different types of security examination components, wherein the information indicates potential security issues. Integration module 104 integrates the information in a network application management platform. Reaction determination module 105 determines appropriate responses to an indication of the potential security issues and reaction direction module 107 directs the response.

Intrusion detection integration system 101 is readily adaptable for use with a network application management platform (e.g., an open view operations network application management platform) to log information. In one exemplary implementation, data collection module 103 collects detection system alert data from a variety of different types of sensors (e.g., HIDS and NIDS) and systems (e.g., from multiple vendors). The data collection module 103 collects the data as directed by integration module 104. For example, the integration module 104 selects appropriate "hooks" in one of the intrusion detection systems from which to retrieve information. In one embodiment, data collection module 103 logs information on intrusion detection indications (e.g., in alarms and/or alerts). For example, the alerts can be provided by a simple network management protocol, a system log and/or an application program interface. The collection module 103 can also analyze a plurality of manners in which an alert can be provided and can select the manner that is the most secure with the least dependencies in a communication path.

Referring still to FIG. 1A, integration module 104 consolidates and correlates the intrusion detection information. Integration module 104 can filter intrusion alarm information (e.g., filter out information that is not qualitatively or quantitatively relevant) and organize the alarm attribute information (e.g., include and organize by time stamp, component name, attacker detail, details about the target of the attack, etc.). The integration of the intrusion detection information can be performed in accordance with an intrusion detection strategy or policy. For example, if an intrusion detection policy indicates that a predetermined number of attacks directed at a particular destination (e.g., a host) within a certain amount of time is indicative of a type of potential intrusion attack, integration module 104 can direct organization (e.g., consolidation and correlation) of the information accordingly and also assign an appropriate severity indication in accordance with the intrusion detection policy. Integration module 104 also provides a coordination of different received message terminology into a severity assignment hierarchy with unified terminology (e.g., normal, warning, minor, critical, etc.).

Reaction determination module 105 and reaction direction module 107 facilitate workflow management of intrusion alarm event resolution. In one exemplary implementation, network application management software is utilized to implement event workflow management for an effective incidence response strategy. The workflow management can also facilitate implementation of role based supervision. For example, there can be an operator role permitting a user to participate in intrusion detection without changing the operations (e.g., policies, delete alarms, remove sensors, etc.) and an administrator role that can participate in and change intrusion detection operations. In one embodiment, the modules of intrusion detection consolidation console 102 are embodied as computer readable code on a computer usable storage medium and can cause a computer system to implement consolidated intrusion detection.

Figure 1B:
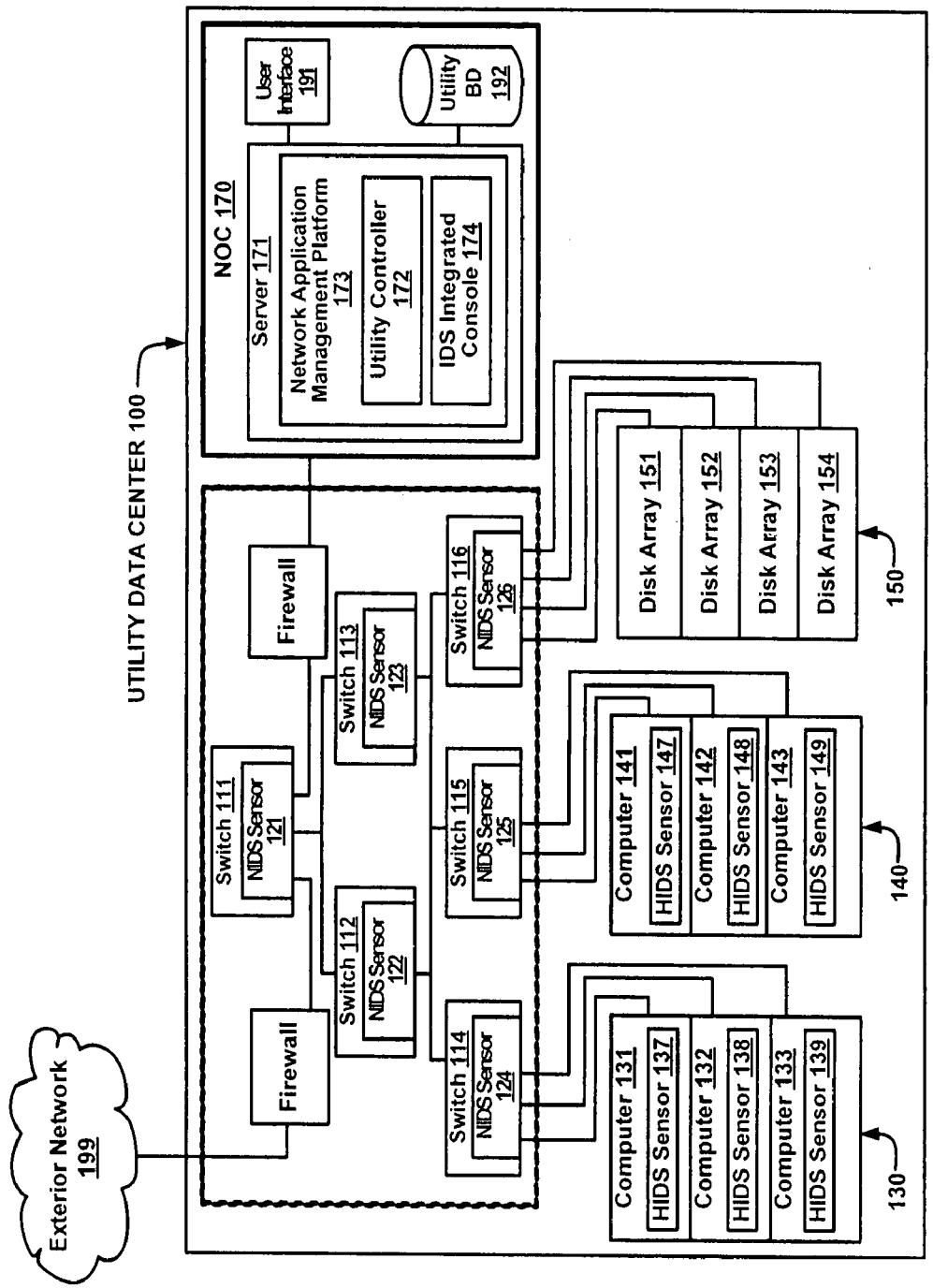
FIG. 1B is a block diagram of an exemplary utility data center (UDC) upon which embodiments of the present invention can be implemented.

FIG. 1B is a block diagram of an exemplary utility data center (UDC) 100 upon which embodiments of the present invention can be implemented. In one embodiment, UDC 100 provides open system support for a plurality of multi-vendor computing resources. As such, the UDC 100 can provide support to computing resources that have the same functionality (e.g., firewalls) but are provided by different vendors. It is appreciated that UDC 100 can include elements in addition to those shown (e.g., more racks, computers, switches and the like), and can also include other elements not specifically shown or described herein. Furthermore, the blocks shown by FIG. 1B can be arranged differently than that illustrated, and can implement additional functions not specifically described herein. It is also appreciated that a number of components (e.g., utility controller, firewalls, servers, etc.) included in UDC 100 can be implemented in varying degrees of hardware, firmware and/or software.

In the present embodiment, UDC 100 includes switches 111 through 116, equipment racks 130, 140 and 150 and network operations center 170. The switches 111 through 116 are communicatively coupled to each other in a switch fabric organization. Each equipment rack 130, 140 and 150 include various equipment. For example, equipment rack 130 includes computers 131 through 133 communicatively coupled to switch 114, equipment rack 140 includes computers 141 through 143 communicatively coupled to switch 115, and equipment rack 150 includes disk arrays 151 through 154 communicatively coupled to switch 116. It is appreciated that the switches 111 through 116 can be coupled to other equipment (not shown), including computers that are not included in an equipment rack. In this embodiment, the switches and computer systems are interconnected using cables or the like. However, wireless connections between devices in UDC 100 are also contemplated.

In general, UDC 100 includes a programmable infrastructure that enables the virtual connection of selected computing resources as well as the isolation of selected computing resources, thereby enabling security and segregation of computing resources at varying infrastructure levels. The resources included in UDC 100 can be dynamically programmed to logically reconfigure and "separate" the resources into a number of various virtual local area networks (VLANs). In one exemplary implementation, Network Operations Center 170 (NOC) includes server 171 coupled to a user interface 191 and a utility database 192.

The NOC 170 provides for overall control over the UDC 100. In one embodiment, the NOC 170 acts as an interface to the UDC 100 and is manned by network technicians that monitor the management and allocation of computing resources in the UDC 100.

Utility controller database 192 comprises configuration information pertaining to the various resources in UDC 100, including descriptions of the configuration, characteristics, and/or features of a component. For example configuration information can include but not necessarily be limited to indications of the types of devices in UDC 100, representations of each VLAN, a network or MAC (media access control) address for the resources of UDC 100, port numbers of the configurable components, VLAN identifiers associated with each of the port numbers, socket identifier for each cable connected to each of the resources of UDC 100, manufacturer identifiers, model indicators, and/or serial numbers. As resources in UDC 100 are changed (e.g., reallocated), the information in utility controller database 192 is also changed accordingly (e.g., to reflect the reallocation). Changes to the utility controller database 192 can also be used to drive changes to the allocation of resources in UDC 100.

In one embodiment, utility controller database 192 is embodied as a computer-readable network map. It is understood that such a map need not exist in the form conventionally associated with human-readable maps. It is also appreciated that a computer-readable network map can be synthesized on-the-fly from the information stored in utility controller database 192. The network map can include information pertaining to each of the computing resources in the UDC 100 (e.g., configuration attributes).

Server 171 includes a network application management platform 173 (e.g., an open view operation network application management platform) for managing resources in UDC 100 in accordance with information included in utility database 192. For example, utility controller 172 enables the creation, deployment, allocation, and management of VLANs. In one exemplary implementation, utility controller 172 can monitor deployed VLANs, and automatically reallocate resources when there is a reason to do so. In addition, the utility controller 172 monitors shared infrastructure resources, alerting NOC 170 of failures or other significant events. Utility controller 172 utilizes network application management platform 173 to manage resources in UCD 100.

Network application management platform 173 also includes an intrusion detection integration console 174. Intrusion detection integration console 174 consolidates intrusion detection alarms from various sensors and IDS systems. For example, intrusion detection system consolidation console 174 consolidates information from NIDS sensors 121 through 126 and HIDS sensors 137 through 139 and 147 through 149. IDS consolidation console 174 facilitates centralized management of multi-vendor and multi-type sensors with minimal user effort. Intrusion detection integration console 174 provides a centralized alert logging wherein the alerts are consolidated and standardized in the severity assignment and at the same time correlated based on various alert attributes. The correlation of events by intrusion detection integration console 174 helps to provide a high level of confidence in the intrusion alerts by reducing the probability of false positives and false negatives (e.g., beyond what is already done by an individual vendor IDS sensor engine). The correlation also facilitates automated configuration of reactions for the alerts based on various factors, including conforming the reactions to a standard enterprise response strategy.

The flexibly integrated centralized features of intrusion detection integration console 174 provide a number of benefits. As a centralized alert repository, intrusion detection integration console 174 automatically provides data redundancy. Thus, enabling consolidation of investment costs in protecting a centralized repository (e.g., via either backup, digitally signing the database records etc) which provides greater return on investment than the same amount of resources being applied to individual IDS repositories. A mechanism is provided to implement an effective incident response strategy operational framework that is compatible with traditional event handling operational principles and to initiate requisite reactions via the same platform. These mechanisms also enable enforcement of enterprise wide IDS related policies uniformly on the IDS sensors (e.g., via easy-to-use centralized intrusion detection integration console 174). The centralization of the alerting and management framework for the IDS as disclosed herein, helps in reducing cost by facilitating reduction of the number of operators having specialized knowledge of using each proprietary IDS system management console otherwise required to attempt a flexible and extensive IDS solution implementation.

In addition to computer systems and switches, the UCD 100 can include other types of components such as, but not limited to, routers, load balancers, firewalls, and hubs. These other types of devices may also be programmable or configurable. Although described primarily in the context of UDC 100, the features of the present invention are not so limited. The present invention can be used with a variety of components in various configurations.

FIG. 2 is a flow chart of integrated intrusion detection method 200, one embodiment of the present invention. Integrated intrusion detection method 200 provides a consolidation and correlation of intrusion detection information. Integrated intrusion detection method 200 also facilitates implementation of responses to intrusion detection alerts.

In step 210, information from a plurality of different types of intrusion detection sensors is gathered. The present invention is compatible with a variety of interfaces provided by different vendors for network or IDS components to log new alerts to a third party product. For example, mechanisms can include a Simple Network Management Protocol (SNMP), syslog or an Application Programming Interface (API) through which the alerts are pushed out as they are raised. In one exemplary implementation, a HIDS provides the API, a NIDS provides SNMP traps, while the network devices log to a system log (e.g., syslog). The present invention is also able to react to a device or system that includes more than one way to provide the alerts to an external interface by analyzing each of the ways and selecting the method that is the most secure and has fewer dependencies in its communication path. For example, the API can be a preferred method because with the help of management application network platform (e.g., OVO) agent features it is possible to ensure that an alert does not leave the system on which the alert is detected. Alternatively, even though syslog approach and SNMP can be equally secure, SNMP can be more desirable than the syslog approach because it is less difficult to scale and less accessible for use by rogue applications that can embed false alerts into the syslog. In addition, a determination can be made whether the same channels are used by an IDS or network device to log any specific errors, so that those errors can also be channeled to a central repository.

At step 220, the information is processed in a manner that provides a consolidated correlation of the information. For example, after selecting the appropriate hooks in the IDS or network devices, a determination is made on how the information can be integrated with management network application platform mechanisms. In one exemplary implementation, an open view operation (OVO) SNMP trap interceptor can be used to handle SNMP trap based alerts. An OVO logfile encapsulator can handle syslog-based alerts, and an OVO message interceptor can be made to handle API propagated alerts with the help of an operation center message (opcmsg) mechanism. In one embodiment, a small program/script is written to convert the API alerts into an operation center message (opcmsg) created with OVO message alerts. For SNMP trap based alerts, the MIB (Management Information Base) can be used to configure the SNMP trap templates, and then these templates can be applied in an OVO managed host that is not only reachable by the SNMP trap originating host, but also is the closest, is trusted, and provides redundant channels of communication to both the SNMP originating host and the OVO manager server. When utilizing the OVO logfile encapsulator, logfile templates can be configured to match the IDS messages logged to syslog and then these templates can be applied to an OVO agent on the trusted syslog server. Finally, the OVO message templates can be configured to correctly handle (e.g., match) the operation center messages (opcmsg) created OVO messages and they can be applied to the host on which the opcmsgs get instantiated.

The management network application platform templates provide a convenient and efficient way to consolidate and correlate various alarm information. For example, in an OVO environment the same message group (e.g., IDSAlert) is configured for each template handling IDS alerts and another common message group (e.g., IDSError) is configured for handling IDS errors. Using a variable feature provided in OVO templates to parse and filter through the incoming alert information, the alert message is re-configured to a standardized format. For example, the alert message can be reconfigured in a format specified in an enterprise wide security policy, so that the resulting consistency with the established enterprise wide security policy makes it easy for an operator to relate to the information and easily and quickly correlate the implications of different alarms.

Referring still to step 220 of FIG. 2, standardizing the format for incorporating the IDS alerts into templates includes information related to correlation attributes and incidence response attributes of the alarm in one embodiment. For example, alarm correlation information can include a date and time stamp (which can be assigned by default), severity, component or sensor name (e.g., Domain Name Server name, Internet Protocol address, firewall interface name, etc.) and type (e.g., NIDS, HIDS, firewall, etc.), attacker details, signature type or attack details, and attacked victim host details. The alarm incidence response attribute information can include cause information (e.g., what is the root cause of an alert), recommended action(s) for an operator to take (or alternatively provide a document that explains the response strategy policy framework and provides actions to be taken for attacks of differing seventies), automatic reactions configured as a response, and references to more detailed information about the alerts (e.g., the IDS generalized user interface console specifics, or a pointer to a document / site that explains the attack detected). In one exemplary implementation, the messages use consistent message terminology.

While configuring the templates, a standard methodology for assigning severities to the incoming alerts is utilized. The severity that an individual IDS solution might have already assigned to a particular alert is not necessarily accepted. In one embodiment, the severity assignment is accepted if severity assignment is already standardized across the IDS solutions while configuring them individually. This can be done using the alert content (including severity assigned to it by the individual IDS) and enterprise wide security policy defined standards/guidelines.

With continued reference to step 220 of FIG. 2, standardizing the severity assignment for the IDS alerts includes a normal category, a warning category, a minor alert category, a major alert category and a critical alert category in one embodiment of the present invention. The normal category includes messages resulting from normal system operations that do not require an operator response. For example, log file rollover or a component restarting as part of normal operations. The warning category includes messages that do not require an operator response but are not part of normal system operation. For example, a common attack that does not require an explicit response (e.g., a ping based port scan) is detected. The minor category includes messages that require an operator response but are not extremely time-sensitive (e.g., the response could happen within hours instead of minutes). For example, a security component has failed over to the backup unit. The major category includes messages that require an operator response and are time-sensitive (e.g., the response should happen within minutes instead of hours). For example, a significant attack (e.g., a password attack) is happening or a security component without a hot-standby backup unit is inoperative or is not functioning properly. The critical category messages include those requiring an immediate operator response. For example, a resource has been compromised.

In one embodiment, event correlation features of an OVO network application management platform are utilized for correlating the alarm events based on various configurable parameters and weight allocation strategies. The weight allocation strategies can be based upon a variety of factors, including importance of alarm event, frequency of occurrence (e.g., from same destination), and type of attack. The parameters can also include identification of the attacker host, identification of the victim host (e.g., the host being attacked), type of attack, severity of attack, time of attack, recurrence count of attack, sensor that detected the attack, etc. These parameters can then be appropriately configured in the templates that handle the alerts to which the correlation applies. The event correlation can be done by using simple template based correlation server features (e.g., that can provide aggregation capabilities based on specific parameters), or with advanced ECS (Event Correlation Service) framework of the OVO platform that provide the same capabilities as a professional IDS correlation product if configured appropriately. In addition to using the event correlation for correlating events for better analysis, correlation can also be used for reducing false positives, reassigning severities, initiating reactions, etc. The correlation of alerts can facilitate maximization of effectiveness for a properly configured IDS solution, and also provide quick response to attacks with less error rates in terms of false negatives or positives.

A response is assigned to the information in step 230. For example, if the alerts are properly isolated and a very definitive reactive strategy has been defined, then reactions can be also configured in the templates. These reactions can be either automated or operator initiated. The automated actions can be used for active reactions (e.g., re-configuring the firewall rule sets or shutting down a host). In one exemplary implementation, automated reactions are configured if the reaction is for critical alerts where there is little room for error in detecting an intrusion attempt and has very fast response requirements. Automated reactions can also be used for activating a different alerting mechanism for major or critical severity alerts (e.g., email, page, etc,). The operator-initiated actions can be configured for minor, major or critical alerts where operator validation of the attack is required before the response. Some alerts can have both reactions configured to break down the reaction phase (e.g., automatically page the operator, and provide an operator-initiated host shutdown action for the operator to initiate after validating that a host has been compromised with a virus).

In step 240, the response is implemented. In one embodiment, an OVO platform also provides a proper framework for an incident response strategy to be implemented. It provides role based access control for different message groups based on the host from which the messages are originating (e.g., the domain which is being monitored by a specific sensor). In one exemplary implementation, the message group and node group configuration responsibility feature are utilized. An OVO platform can also provide a mechanism to implement the lifecycle of an incident handling process, including providing ways to figure out if a specific operator is responding to an alert, providing and indication which stage is the alert is in, if there are notes the operator has documented regarding a response, and providing an indication if the alert is ripe for re-assignment to an active pool.

In one embodiment of the present invention, intrusion detection method 200 also facilitates management of detection sensors. For example, the application feature of an OVO platform can be used for centralized IDS sensor management in which an authorized operator is able to access different sensor resources. In one exemplary implementation, one operator is able to read an IDS configuration file, while another operator is able to actually re-configure the file remotely, including starting and stopping an IDS sensor process after the reconfiguration. In one exemplary implementation, a variety of techniques (e.g., network node manager, SNMP trap handling, monitor templates, etc) can be utilized to detect a sensor is operating (e.g., "alive") and monitor specific performance metrics via a scheduled script (e.g., checking the state of the IDS sensor process, its resource usage, its memory usage etc). An OVO platform can also utilize a template to schedule work on IDS sensors (e.g., backing up the evidence logs and creating fresh logs). Thus, the features of an OVO platform can facilitate effective management of a sensor via a centralized console. In addition, centralized policies regarding the management issues can be uniformly enforced via these mechanisms (e.g., backing up evidence logs across sensors every hour across the infrastructure).

Figure 3:
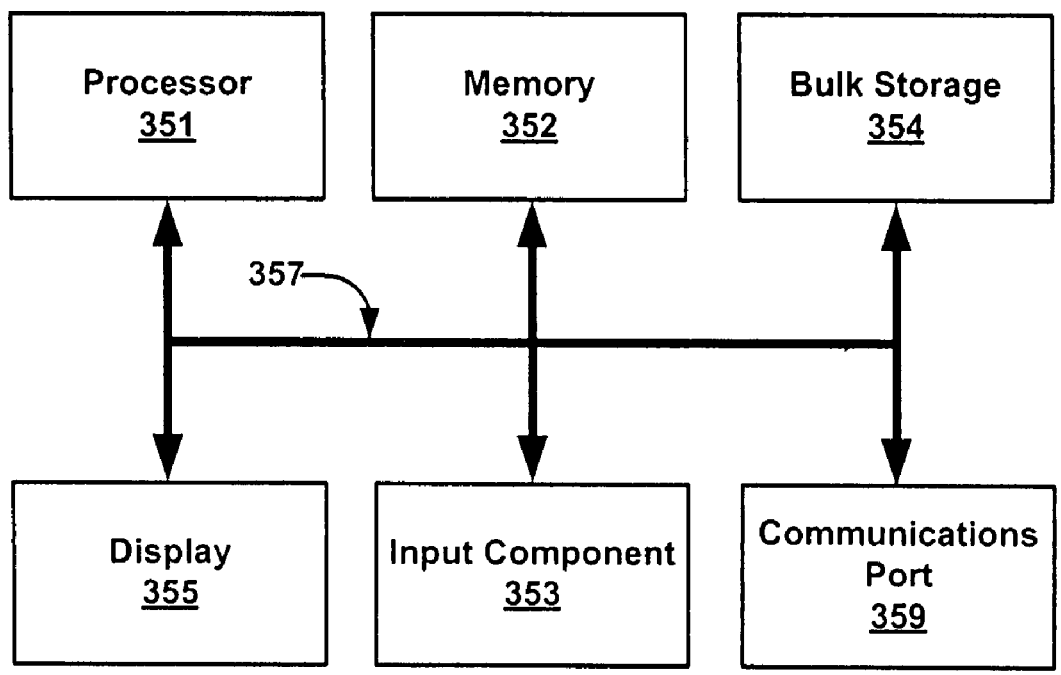
FIG. 3 is a block diagram of one exemplary computer system on which the present invention may be implemented.

FIG. 3 is a block diagram of computer system 300, one embodiment of a computer system on which a present invention intrusion detection central system can be implemented. For example, computer system 300 can be utilized to implement intrusion detection integration console 174 or integrated intrusion detection method 200. Computer system 300 includes communication bus 357, processor 351, memory 352, input component 353, bulk storage component 354 (e.g., a disk drive), network communication port 359 and display module 355. Communication bus 357 is coupled to central processor 351, memory 352, input component 353, bulk storage component 354, network communication port 357 and display module 355.

The components of computer system 300 cooperatively function to provide a variety of functions, including performing emulation application revision in accordance with the present invention. Communication bus 357 communicates information. Processor 351 processes information and instructions, including instructions for coordinating security information from a plurality of different security intrusion attempt identification components. For example, the instructions include directions for integrating (e.g., consolidating and correlating) IDS information. Memory 352 stores information and instructions, including instructions for coordinating security information from a plurality of different security intrusion attempt identification components. including, integrated IDS information. Bulk storage component 354 also provides storage of information. Input component 353 facilitates communication of information to computer system 300. Display module 355 displays information to a user. Network communication port 357 provides a communication port for communicatively coupling with a network.

Thus, a present invention consolidation intrusion detection system and method provide an effective Intrusion Detection System (IDS) for a relatively large infrastructure while minimizing traditional consolidation and correlation difficulties. The present invention is capable of integrating different types of IDS components from different vendors, including a Host based Intrusion Detection System (HIDS) and a Network based Intrusion Detection System (NIDS). The present invention can seamlessly incorporate information from existing legacy systems and provide new functionality for interpreting and utilizing the information. Providing a standardized aggregate correlated alert view of the report that would otherwise be various interfaces depending upon the vendors, improves effectiveness by reducing false positives and false negatives.

The present invention also provides a more effective response mechanism to take care of an attack and permits detection and reaction based on the overall security policy of the enterprise. The centralized management (e.g., sensor health checks) of multi-vendor and different type sensors helps to ensure that the entire solution is working correctly as expected. The present invention also provides a way to implement a very effective incident response mechanism that can adhere to the security policy of an enterprise while also providing a traditional event handling operational framework. The solution also provides ways to enforce enterprise IDS security policies over different IDS sensors uniformly via a centralized standard easy to use framework. Automatic data redundancy provided by the present invention enabling consolidation of investment costs in protecting centralized resources which provides greater return on investment than the same amount of resources being applied to individual IDS repositories.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the claims appended hereto and their equivalents.

What is claimed is:

1. An integrated intrusion detection method comprising:
    gathering information from a plurality of different types of intrusion detection sensors;
    processing said information, wherein said processing provides a consolidated correlation of said information;
    assigning a severity to said information based on an enterprise wide security policy;
    assigning a response corresponding to said information and corresponding to said severity; and
    implementing said response according to said severity.

2. An integrated intrusion detection method of claim 1 wherein said information includes intrusion detection alerts.

3. An integrated intrusion detection method of claim 2 further comprising centrally tracking information associated with intrusion detection alerts from said plurality of different types of intrusion detection sensors.

4. An integrated intrusion detection method of claim 3 wherein said tracking information associated with intrusion detection includes assigning severity assignments standardized across said plurality of different types of intrusion detection sensors.

5. An integrated intrusion detection method of claim 2 wherein said intrusion detection alerts are correlated based upon various alert attributes.

6. An integrated intrusion detection method of claim 2 wherein said response conforms to an enterprise wide strategy.

7. An integrated intrusion detection method of claim 1 further comprising managing said intrusion detection sensors.

8. A computer usable storage medium having computer readable program code embodied therein for causing a computer system to implement intrusion detection instructions comprising:
    a data collection module for receiving information from a plurality of different types of intrusion detection sensors, wherein said information indicates potential security issues;
    an information severity determination module for assigning a severity to said information based on an enterprise wide security policy;
    an integration module for integrating said information in a network application management platform;
    a reaction determination module for determining appropriate response to indication of said potential security issues according to said severity; and
    a reaction direction module for directing said response according to said severity.

9. A computer usable storage medium of claim 8 wherein said information includes intrusion detection system alert data.

10. A computer usable storage medium of claim 8 wherein said integration module selects a hook in an intrusion detection system.

11. A computer usable storage medium of claim 8 wherein said data collection module logs alerts from said plurality of different types of intrusion detection sensors.

12. A computer usable storage medium of claim 8 wherein said alerts are provided by a simple network management protocol (SNMP), a system log and an application program interface.

13. A computer usable storage medium of claim 8 wherein said integration module includes analyzing a plurality of manners in which an alert can be provided and selecting the manner that is the most secure with the least dependencies in a communication path.

14. A computer usable storage medium of claim 8 wherein said integration module utilizes a network application management platform to log information.

15. A computer usable storage medium of claim 14 wherein:

an open view operation simple network management protocol trap is utilized to handle simple network management protocol trap based alerts;
an open view operation log file encapsulator handles system log based alerts; and
an open view message interceptor handles application program interface propagated alerts with the help of an operation message mechanism.

16. A computer usable medium of claim 14 wherein a secure open view template configuration is utilized to log information and the one message group is configured for handling intrusion detection system alerts and another message group is configured for handling intrusion detection system errors.

* * * * *

UNITED STATES PATENT AND TRADEMARK OFFICE
CERTIFICATE OF CORRECTION

| | | |
|---|---|---|
| PATENT NO. | : 7,712,133 B2 | Page 1 of 1 |
| APPLICATION NO. | : 10/600113 | |
| DATED | : May 4, 2010 | |
| INVENTOR(S) | : Amit Raikar et al. | |

It is certified that error appears in the above-identified patent and that said Letters Patent is hereby corrected as shown below:

In column 14, line 1, in Claim 16, after "usable" insert -- storage --.

Signed and Sealed this

Second Day of November, 2010

David J. Kappos
*Director of the United States Patent and Trademark Office*